(12) United States Patent
Sonnenrein

(10) Patent No.: US 10,928,106 B2
(45) Date of Patent: Feb. 23, 2021

(54) DEVICE AND METHOD FOR COOLING A LIQUID AND USE OF THE DEVICE AS A COMPONENT FOR A STORAGE ARRANGEMENT

(71) Applicant: Gerrit Sonnenrein, Paderborn (DE)

(72) Inventor: Gerrit Sonnenrein, Paderborn (DE)

(*) Notice: Subject to any disclaimer, the term of this patent is extended or adjusted under 35 U.S.C. 154(b) by 175 days.

(21) Appl. No.: 15/776,507

(22) PCT Filed: Nov. 17, 2016

(86) PCT No.: PCT/EP2016/078074
§ 371 (c)(1),
(2) Date: May 16, 2018

(87) PCT Pub. No.: WO2017/085224
PCT Pub. Date: May 26, 2017

(65) Prior Publication Data
US 2018/0347870 A1    Dec. 6, 2018

(30) Foreign Application Priority Data

Nov. 17, 2015  (DE) .......................... 102015119858.4

(51) Int. Cl.
*F25B 21/02*    (2006.01)
*F25B 21/04*    (2006.01)
(Continued)

(52) U.S. Cl.
CPC .............. *F25B 21/04* (2013.01); *F25B 21/02* (2013.01); *F25D 16/00* (2013.01); *F25D 31/002* (2013.01);
(Continued)

(58) Field of Classification Search
CPC ...... F17C 2227/0376; F17C 2227/0379; F17C 2227/0381; B67D 1/0057; B67D 1/0061;
(Continued)

(56) References Cited

U.S. PATENT DOCUMENTS 2,514,463 A * 7/1950 Bayers, Jr. .......... B01F 3/04808
261/130
4,821,914 A * 4/1989 Owen ....................... F17C 3/08
220/592.21
(Continued)

FOREIGN PATENT DOCUMENTS

DE     102013215255 A1    5/2015
WO    WO 2006/034829 A1   4/2006
(Continued)

OTHER PUBLICATIONS

International Search Report issued by the European Patent Office in International Application PCT/EP2016/078074.

*Primary Examiner* — Frantz F Jules
*Assistant Examiner* — Erik Mendoza-Wilkenfel
(74) *Attorney, Agent, or Firm* — Ursula B. Day, Esq.

(57) ABSTRACT

A device, for cooling a liquid, especially a beverage, comprising a cold accumulator and a thermal line, the cold accumulator and the liquid to be cooled being thermally connected by means of the thermal line, and the cold accumulator comprising a phase change material, the device also comprising means for dissipating heat from at least the thermal line, and the cold accumulator comprising a carrier material into which the phase change material is integrated.

24 Claims, 1 Drawing Sheet

(51) Int. Cl.
*F25D 16/00* (2006.01)
*F25D 31/00* (2006.01)
*F28D 7/02* (2006.01)
*F28D 20/02* (2006.01)
*F28D 21/00* (2006.01)
*F28F 1/40* (2006.01)
*F28F 21/06* (2006.01)

(52) U.S. Cl.
CPC ............ *F28D 7/024* (2013.01); *F28D 20/021* (2013.01); *F28D 20/023* (2013.01); *F28D 2021/0042* (2013.01); *F28F 1/40* (2013.01); *F28F 21/06* (2013.01); *Y02E 60/14* (2013.01)

(58) Field of Classification Search
CPC .... F28B 21/02; F28B 21/04; F28B 2321/023; F28B 2321/025; F28B 2321/0251; F28B 2321/0252; F28D 2020/0013
See application file for complete search history.

(56) References Cited

U.S. PATENT DOCUMENTS

| | | | | |
|---|---|---|---|---|
| 5,192,513 | A | * | 3/1993 | Stumphauzer ............ A23L 2/54 222/129.1 |
| 8,641,018 | B2 | | 2/2014 | Sonnenrein |
| 2002/0162339 | A1 | * | 11/2002 | Harrison .............. B67D 1/0869 62/3.7 |
| 2003/0188540 | A1 | * | 10/2003 | Van Winkle ......... B67D 1/0869 62/3.64 |
| 2011/0177201 | A1 | | 7/2011 | Sonnenrein |
| 2017/0087799 | A1 | * | 3/2017 | Buttner .................... B32B 5/02 |

FOREIGN PATENT DOCUMENTS

| | | |
|---|---|---|
| WO | WO 2013/041841 A2 | 3/2013 |
| WO | WO 2016/008716 A1 | 1/2016 |

* cited by examiner

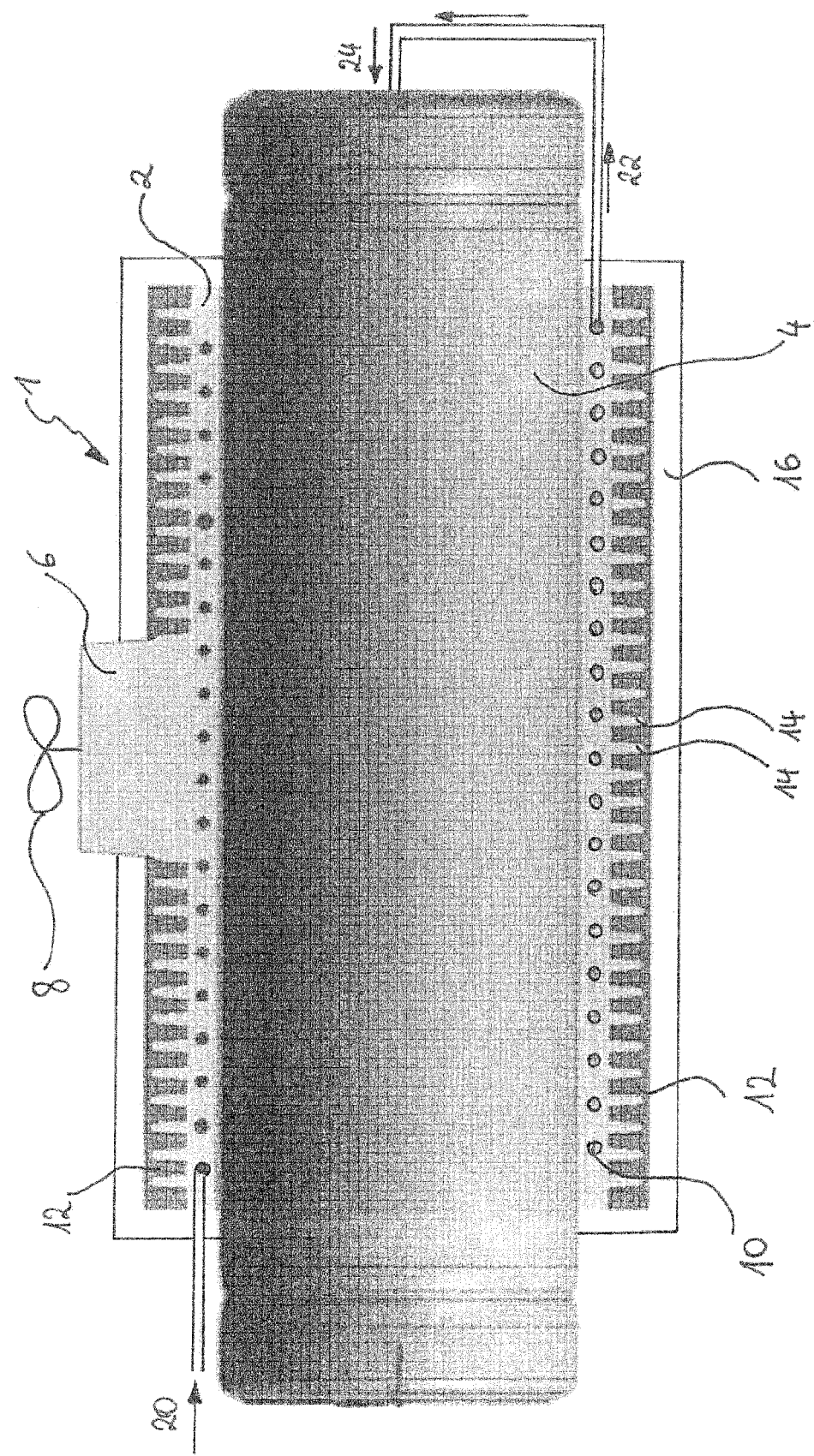

DEVICE AND METHOD FOR COOLING A LIQUID AND USE OF THE DEVICE AS A COMPONENT FOR A STORAGE ARRANGEMENT

CROSS-REFERENCES TO RELATED APPLICATIONS

This application is the U.S. National Stage of International Application No. PCT/EP20161078074, filed Nov. 17, 2016, which designated the United States and has been published as International Publication No. WO 2017/085224 A1 and which claims the priority of German Patent Application, Serial No. 10 2015 119 858.4, filed Nov. 17, 2015, pursuant to 35 U.S.C. 119(a)(d).

BACKGROUND OF THE INVENTION

The present invention refers to a device for cooling a liquid, in particular an aliment such as a beverage, as well as use of the device as a component of a supply reservoir for storing the liquid.

Cooling devices for aqueous liquids, especially beverages, are know in the prior art. A primary goal thereby is to remove heat from the liquid to be cooled. Several devices and techniques for this are known in the prior art. For example, it is known that thermoelectric modules such Peltier-elements are utilized with cooling devices for cooling drinking water and beverages. A Peltier-element is a thermoelectric converter, which, based on the Peltier effect, which at electrical current flow produces a temperature differential or, at a temperature differential, produces an electrical current flow. Peltier-elements can be utilized for cooling and, at reverse electrical current direction, as well as for heating.

A disadvantage when using thermoelectric modules, such as Peltier-elements, is that these can only provide a relatively small cooling- or heating capacity per time unit.

Another possibility, to remove heat from a liquid is provided by using latent heat accumulators. These offer the possibility of storing thermal energy at relatively high energy density. Thereby, the melting- or solidification enthalpy of materials is utilized the melting- or solidification temperature of which lies in the range of the application-/transformation temperature of the methods used. Such materials are designated in English as Phase Change Material, PCM for short.

A PCM each, has a temperature range typical for this compound and for which it can be used as a heat storage and/or cooling element and has a characteristic transition temperature. At temperatures above that, the PCM takes up heat and transitions but remains at a constant temperature. For example, in this manner it is ensured that it can uptake a certain heat energy, before the temperature of the material rises. The heat capacity is however limited, which renders it incapable to provide a continuous heat uptake. Also, a latent heat accumulator requires repeated regeneration.

PCMs are known that run through various phase transition and can provide a high heat storage capacity in the respective PCM-material-typical temperature ranges. Thereby, the phase transition of the PCMs can be configured in different ways. For example, there are solid/solid transitions that are a transition of one crystal modification into another one. Furthermore, known are also solid/liquid-phase-transitions, such as occur at smelting. However, there is the disadvantage that a PCM according to its current phase is not a solid and thus cannot be installed to a body as a construction part.

In this situation there is always the need for another device which contains the PCM. It is furthermore disadvantageous that the PCM has certain vapor pressure. Additionally, there is the danger that a PCM upon changing phases, will eventually loose thermal contact to the cooling medium, for example, when the PCM, in a certain space, due to gravity is dropping or running downward. As a result, air gaps are able to form between the medium to be cooled and the PCM. Most PCMs have a tendency to exhibit poor thermal conductivity. This problem increases an eventual gap formation to the medium to be cooled.

As a result, there remains the problem in the prior art, that a PCM cannot be installed in any number of arbitrary positions.

Object of the present invention is to provide a device for cooling aqueous liquids, in particular, beverages, to obviate the disadvantages of the prior art. It is especially an object of the present invention to provide a device for cooling a liquid, which provides that function independent of its installation position.

SUMMARY OF THE INVENTION

The object is solved by a device for cooling of a liquid having the features of claim 1, as well as a use of the device as a component for a storage arrangement having the features of claim 24. Advantageous further embodiments are given in the respective dependent claims. All combinations and also single combinations between the device and use of the device can be used together. In addition it is also contemplated and possible, to combine single or multiple features of the device and use of the device in any combination.

According to the present invention, a device is proposed for cooling a liquid, in particular a beverage. The device includes a cold accumulator and a thermal line, wherein the cold accumulator and the liquid to be cooled are connected via the thermal line and wherein the cooling storage includes a phase change material. The device is also provided with means to remove the heat at least from the thermal line. The cold accumulator further includes a carrier material, in which is integrated into the phase change material is integrated.

"Cooling" or "supplying cold" in this context, is also to be understood as "dissipating heat". Furthermore "heat" is also to be understood as "lack of cold" and "cold" is to be understood as "lack of heat".

Phase change material in this context is understood to be a so-called latent heat accumulator or a Phase Change Material, PCM. For example, with these materials, the melting-, respectively the solidification enthalpy is utilized in the application/conversion temperature of the respective process.

From the following, it is understood that "material" and "matrix material" is understood as a carrier material, into which the PCM is integrated.

"Integrated" in this context is to be understood that the PCM or an encapsulation, in which the PCM is included. In its formulation it is surrounded by carrier material in such a manner that will not permit evaporation, exudation or bleeding of the PCM in its various aggregate states during the process.

By integrating the phase change material into another material, any shifting or displacement of the phase change material depending on the state of aggregation and installation position of the device, such as for example, a seeping down in liquid or viscous form is avoided. In this manner, lack in thermal contact between the thermal line and the PCM, such as through spatial distances between the thermal line and the PCM, is also prevented.

It is basically possible that a PCM is mixed with another material. Furthermore, it is also possible that an encapsulated form of PCM is being added to another material. Moreover, layers of PCM can be introduced into another material, or such material can have pores or hollow spaces into which a PCM is introduced.

Furthermore, the PCM can be integrated into a matrix, wherein it is contemplated that the PCM, or an encapsulation of the PCM has reactive groups for coupling to another material.

In a further embodiment, the phase change material can be integrated into a polymer as support-, or matrix material. Thereby, it is advantageous, that the composition is free of exudation or bleeding. Integration of the phase change material into a polymer can be for example carried out by an extrusion process, such when using paraffin as a phase change material.

Phase change material can be for example, natural as well as synthetic paraffins, for example those having a melting point of from 0 to 20° C., preferred from 0 to 10° C. and especially preferred about 5° C.

In a further embodiment, the PCM includes paraffin. For example, the paraffin can be a natural paraffin or a synthetic paraffin.

Especially preferred is that the PCM is evenly distributed within the carrier material. Such a distribution can be realized through essentially even mixing of the PCM into the carrier material. In addition, chemical compounds between PCM and a carrier material are also envisioned. Furthermore, it is also possible that the PCM is indirectly, for example, via encapsulation, attached to the carrier material.

"Even" or evenly" in this context means that the PCM is distributed across the cold accumulator and essentially represents a constant percentage relative to the fixed size of the cold accumulator or of the carrier material. For example, a constant weight percentage (weight %) or volume percent (vol. %) of the PCM relative to the cold accumulator or the carrier material, is possible.

In a further embodiment, the carrier material includes a polymer in the carrier material. The polymer can be present for example as a polymer blend or a block polymer.

Polymer blend in this context is understood as a mixture of two or more different polymers. The mixture is of a physical nature, so that no new chemical bonds ensue between the polymer macro molecules.

Block polymer in this context is understood to be a polymerization of monomers without an additional solvent.

In a further embodiment, the carrier material includes polymers or polymer blends from the group LDPE (Low Density Polyethylene), HDPE (High Density Polyethylene) <PMMA (Polymethylmethacrylate), Polycarbonate and/or block copolymers, especially styrene-block-co-polymers, and mixtures of these.

In a further embodiment, the weight of the carrier material relative to the weight of the cold accumulator is 1 to 25% by weight, preferred 1 to 20% by weight and especially preferred 1 to 10% by weight.

As PCMs exhibit a low heat conductivity in many embodiments, it is especially advantageous when the carrier-, or matrix material is very heat conductive, or the heat conductivity is increased by suitable filler material so that heat, or cold can be transported to and from the PCM.

Thereby, it is advantageous that there are no or only very small interactions of the PCM with a carrier-, matrix-, or encapsulation material. In particular, a diminishment of a heat accumulation capacity should be avoided.

Essentially, the Phase Change Material should be embedded into another material that is designated here as carrier- and/or matrix material, and that the Phase Change Material is distributed across the material and integrated into same such that the afore-described disadvantageous properties and effects of the Phase Change Material are prevented. The Phase Change Material should be surrounded by or integrated into the carrier material through any aggregational condition the PCM can take on and remain in the carrier material. At the same time, the carrier material should be such that heat from the thermal line to the PCM is being transported back. In this manner, the liquid to be cooled releases heat to the thermal line.

Polymers, in particular elastomeric hardened polymers are essentially used as matrix materials.

These elastomeric materials improve the connectivity of the PCM or of the encapsulating material of the PCM in the matrix material.

In a further embodiment, the carrier material includes an additive.

Advantageously, the additive improves the heat conductivity of the cold accumulator. For example, carbon structures can be incorporated into a support-/or matrix material. It is also advantageous to incorporate, metal fibers, metal foams, metal oxide or ceramic structures together into the carrier material of the cold accumulator. For example, especially preferred is graphite as an additive.

In a further embodiment where especially graphite materials are being utilized, preferred is expanded graphite, as an additive.

For example, the percentages of these additives are about 5 to 10% by weight relative to the cold accumulator.

The present invention optimizes the properties of the means that continuously dissipate heat, such as for example thermo-electric elements, and an additional cold accumulator.

The maximally dissipated heat energy of the liquid to be cooled results from the capacity of the means heat dissipation and the capacity of cold which the cold accumulator in a regenerated condition can maximally release. These can each supply cold via the thermal line to the liquid to be cooled. Furthermore, the means for heat dissipation can also remove heat from the cold accumulator for the regeneration of the PCM.

A thermoelectric module as a means for heat dissipation from the thermal line normally functions best at a steady, but relative small heat dissipation capacity. This relatively small heat dissipation capacity thus represents the maximal cooling capacity of the thermoelectric module.

On the other hand, a cold accumulator is a passive component, which can either store heat or cold. The cold accumulator can thus take up or release heat or cold depending on its construction or design capacity.

It is contemplated that the means for heat dissipation are capable to remove heat from the liquid to be cooled as well as remove heat from the cold accumulator and that this can and does take place simultaneously. In this manner, heat will be dissipated from the cold accumulator until it is fully loaded. Then, the cold accumulator can take up heat relatively fast from the liquid to be cooled via the thermal line.

The means for heat dissipation serves to continually remove heat from the thermal line, however with a relatively low removal capacity. The heat to be dissipated can thereby originate from the liquid to be cooled or from the cold accumulator or from both.

At high-demand for cooling capacity, the cold accumulator takes up additional heat. The cold accumulator can however take up only a limited amount of heat. The absorption characteristics are such that the cold accumulator, if necessary, can absorb a relatively large amount of heat in a short period of time—until the maximal heat absorption capacity of the cold accumulator is reached. Thereafter, it is necessary that heat is removed again from the cold accumulator in order to regenerate or "charge" the cold accumulator such that, in a new cycle, it can again absorb a relatively large amount of heat.

In a further embodiment, the cold accumulator and the thermal line are adjoining each other at least in a certain area.

Through the interface, the heat transfer rate between the thermal line and the cold accumulator are impacted. Thus, for example, with a larger interface an improved heat transfer can be realized between the thermal line and the cold accumulator.

A direct bordering of the liquid to be cooled at the thermal line can optimize the heat transfer performance between the liquid to be cooled and the adjoining thermal line.

The thermal line can for this purpose be configured as an integral structure in order to guide the liquid to be cooled.

It can also be contemplated for example, that the liquid to be cooled is guided along in a line structure for liquids in the thermal line. This line structure can for example be constructed a helix.

Furthermore, it is contemplated that the liquid to be cooled is guided in various recesses along the thermal line, in the thermal line, or through the thermal line.

Furthermore, it is provided that the liquid to be cooled is taken from a storage tank or a fresh water source and brought into contact with the thermal line.

It is also provided that the liquid which is already cooled through thermal contact with the thermal line for the purpose of storing it is conducted into a storage tank.

Furthermore, it is contemplated that the thermal line is provided with technical devices either upstream or, preferably downstream that enrich the liquid with $CO_2$, that is, for carbonating the liquid.

Such a technical device can be for example, a mixing chamber for a pass-through carbonation or it can be designated as an in-line carbonation.

Such a technical device can also be configured as a storage tank for the liquid to be cooled or, preferably for the liquid already cooled, as an air vessel especially, with an assigned $CO_2$ source.

In a preferred manner, the thermal line is provided with a heat conductive material. Especially preferred is that the thermal line is made from a heat conductive material. Suitable for that are, for example metals, especially aluminum or copper and preferred for their conductivity.

The thermal line can also be constructed as a separate construction component, or it can be integrated into another construction component.

It can be for example provided that the thermal line is produced as one-piece from a cast or by a pressure cast method.

Furthermore, the thermal line may have a surface structure to enlarge an effective heat transfer surface. This can be for example achieved with a lamellar structure. It is especially advantageous if the area of the thermal line with a surface structure is positioned in a first area which borders the thermal line. In this manner, the heat conductivity between the thermal line and the cold accumulator can be improved by the enlarged surface of the thermal line.

In a further embodiment, it is contemplated that the means for removing heat is a thermo-electric element or module. For example, Peltier-elements can be envisioned.

Furthermore, it is provided that the means for heat dissipation can border the thermal line, in particular, in direct thermal contact.

In addition, the means for heat dissipation can include a ventilator to improve heat dissipation into the surroundings by an air stream passing by the means.

In a further embodiment, the device is provided with insulation.

It is also provided that the insulation adjoins the cold accumulator. Hereby, the insulation should surround the cold accumulator in those areas in which it does not adjoin the thermal line. It is thus avoided that the cold accumulator transfers cold to an outer area. This cold would then no longer be available for transfer to the liquid to be cooled.

Moreover, in principle, the entire device could be embedded into insulation.

Insulation can for example comprise a foamed material. Furthermore, insulation could be an air pillow or a vacuum. In addition, an insulation could include means that are cold reflective.

Materials for insulation are contemplated to be especially expanded foams from polystyrene (EPS), polypropylene (EPP) or polyethylene (EPE), preferably from polyurethane (PUR). Furthermore, combinations of the afore-stated are also possible.

In a further embodiment, the insulation is provided with a panel, in particular, a vacuum-insulation-panel.

In a further embodiment, the device includes a storage tank for taking up the liquid. Preferably, the thermal line adjoins the storage tank. The storage tank and the thermal line are in thermal connection or are insulated relative to each other.

It may also be envisioned that the storage tank and the thermal line are in thermal connection when the storage tank is taking up already cooled liquid after being cooled.

Furthermore, it is also advantageous when the storage tank and the thermal line are thermally insulated relative to each other. For example, it is advantageous when the storage tank is selected to hold an uncooled liquid. It can be of advantage if the storage tank show a temperature that is higher than the temperature to which the liquid is being cooled.

For example, the liquid container can be configured to contain a cooled liquid. The liquid can be taken from the container and be supplied to the thermal line for cooling. Thereafter, the liquid can be for example guided to an outlet point.

In an alternative embodiment, the storage tank is configured to make the already cooled liquid available. The liquid can be for example prepared in that an uncooled liquid taken from another storage tank for uncooled liquids or liquid from a fresh water source and supplied to the thermal line for cooling. The cooled liquid is then supplied to the storage tank for stocking up. Subsequently, the cooled liquid is extracted from the storage tank and guided to an outlet, for example a spigot or a tap.

Furthermore, it is preferred that the storage tank is arranged within the thermal line, wherein the thermal line surrounds the storage tank.

In a further embodiment, it is provided that the thermal line is forming the storage tank as an integral component.

In a preferred embodiment, the thermal line is essentially formed as a hollow cylinder. The thermal line can be also configured in any other shape.

It is preferred that the cold accumulator, is principally arranged at the outer shell of the thermal line.

In an especially preferred embodiment, the device can be a carbonating device such as a carbonator for carbonizing the liquid. This is especially preferred, since such a cooling device and a carbonizing device together can be a unit. The need for this is given, in that oftentimes beverages must be carbonated shortly before being tapped. In this manner, there is no need for several units or devices, since these two functions are integrated in the afore-described device.

In a carbonator, the liquid, for example, drinking water is mixed under pressure with $CO_2$. This can be achieved in an in-line-method, wherein the liquid to be carbonated is guided through a mixing chamber in which the streaming liquid is supplied with gaseous $CO_2$, preferably under pressure, which is above the equilibrium pressure of the $CO_2$ dissolved in the liquid at the given temperature of the liquid. The carbonated liquid can then be supplied to a further storage tank for storing and/or to a tap point for tapping from the device.

This can also take place in a wind vessel, that is, a storage tank in which the liquid to be carbonated is stored and which is kept under $CO_2$. The gas pressure of the $CO_2$ supplied to the wind vessel is again preferably above the equilibrium pressure of the $CO_2$ that is, dissolved in the liquid at the given temperature of the liquid stored in the wind vessel. To take out the carbonated cooled liquid from the device, the liquid is guided to a tapping point.

In an especially preferred embodiment, the device comprises a pump with which the liquid supplied to the mixing chamber or the wind vessel is put under an elevated pressure relative to ambient pressure. In particular, the pump is engaged to put the liquid under pressure, which essentially corresponds to the equilibrium pressure of $CO_2$ dissolved in the liquid at a temperature at which the liquid is calibrated by the thermal interaction with the thermal line. This pump can be arranged either up- or downstream at the area of interaction between the liquid and the thermal line.

The present invention comprises also a method, which can be carried out for the intended use as afore-described in all different embodiments.

In addition, and also separate from the afore-described device, according to the spirit of the invention, also proposed is the use of the described device as a component for a storage arrangement for storing liquid. It is especially preferred that the thermal line is configured as a walls for the storage arrangement.

Furthermore preferred is that the thermal line is configured as a hollow cylinder. However, the thermal line can also be formed in any other shape.

Additionally, and advantageously the bottom and ceiling are provided as walls, so that a closed storage space is formed in the interior of the thermal line. This arrangement has the advantage that no separate storage tank, in addition to the thermal line need be provided.

With this preferred use, the thermal line can thus form the walls of the storage tank, so that further construction parts can be spared. Additionally, the wall at the same time has a cooling function.

It can also be provided that the device is configured, at least partially, as a housing for a carbonator and is either comprised of this or is made as such.

Especially preferred is the hollow cylindrical shape, wherein the thermal line is shaped as a hollow cylinder and a wall, or a shell surface of a housing for the carbonator. In this embodiment, the thermal line, on the one hand, can at least partially form a housing for the carbonator and, on the other hand contain a cooling device integrated into the housing.

An example of another advantageous configuration of an embodiment is shown in the FIGURE that follows. The features shown there are not limited to this embodiment. Rather one or more of the afore-described features can be combined with one or more of the present embodiments in a further development of the present invention.

BRIEF DESCRIPTION OF THE DRAWING

FIG. 1 shows a cooling device with storage tank.

DETAILED DESCRIPTION OF PREFERRED EMBODIMENTS

Shown in FIG. 1 is a cooling device 1 where a thermal line 2 is configured as a hollow cylinder which surrounds a storage tank. The thermal line 2 is made of aluminum and configured as a pressure-cast body.

The thermal line 2 borders directly at a means to remove heat 6 from the thermal line 2 and is thermally connected to the means. The means for heat dissipation 6 is illustrated here schematically as a block. Preferably, it is an evaporator or a Peltier-element. The means for dissipating heat 6 also includes a ventilator 8, which supports the removal of heat by air movement and thus supports removal of air from the thermal line.

The thermal line 2 is provided with a helical channel 10 which extends as a spiral through the hollow cylinder and the liquid to be cooled is guided through this helical line 10, wherein the liquid to be cooled and the thermal line 2 are thermally connected.

The thermal line 2 borders at the cold accumulator 12, wherein the outer shell surface of the thermal line 2 is provided with lamellae 14. The cold accumulator 12 is formed as a structure embedded into the lamellae 14 of the thermal line 2.

For example, cold accumulator 12 can be made from a polymer with bonded phase change material, wherein the polymer preferably includes a heat-conducting additive, such as for example, graphite. This improves the thermal coupling of the cold accumulator 12 to the thermal line 2.

The lamellae 14 enlarge the heat transfer surface between the thermal line and the cold accumulator 12 and also improve the thermal coupling of the thermal line to the cold accumulator.

The cold accumulator 12 includes an additional insulation 16 which surrounds the cooling device 1 in the area of cold accumulator 12, so that the cold accumulator 12 basically can only supply cold to the thermal line 2. This does not cause dissipation in the capacity of the cold accumulator in order to cool the exterior area of the device, but supplies only cold to the liquid to be cooled.

The device is further set up so that the beverage to be cooled is guided into the cooling device at the inlet side 20 and leaves the cooling device at an outlet side 22 as a cooled beverage.

Additionally, it is provided that the cooled beverage is introduced into the storage tank 4 at an inlet point. The storage tank 4 can be configured in various ways; on the one hand, it can be set up to hold a cooled beverage and on the other hand, it can also include further functions and devices such as, for example, a carbonator for carbonating the cooled beverage (carbonator not shown here).

Since the carbonator is a device where a certain pressure must build up in order to carbonate the beverage, it can be further contemplated that the thermal line is equipped to ensure a certain pressure stability in the storage tank 4.

FIG. 1 illustrates tank 4 in a top view, while the thermal line 2 and the arrangement in the cold accumulator 12 showing the means for cooling 6 are shown in a sectional view.

The invention claimed is:

1. A device for cooling a liquid, comprising, a cold accumulator and a thermal line, said cold accumulator comprising a phase change material and a carrier material and is thermally connected to the liquid to be cooled via the thermal line, wherein the device further comprises an additional heat dissipator for heat dissipation at least from the thermal line, and wherein the phase change material is integrated into the carrier material, and the cold accumulator includes an expanded graphite additive.

2. The device according to claim 1, wherein the phase change material includes paraffin.

3. The device according to claim 2, wherein the carrier material includes a polymer.

4. The device according to claim 1, wherein a percentage of the carrier material relative to the cold accumulator is between 1 and 10% by weight.

5. The device according to claim 1, wherein the carrier material forms a matrix, in which the phase change material is integrated.

6. The device according to claim 1, wherein the cold accumulator and the thermal line are adjoining each other at least in a certain area.

7. The device according to claim 1, wherein the thermal line has an integral structure to guide the liquid.

8. The device according to claim 1, wherein the thermal line is from a heat conducting material.

9. The device according to claim 1, wherein the thermal line includes a surface structure that enlarges the effective heat transfer surface.

10. The device according to claim 9, wherein the surface structure includes lamellae.

11. The device according to claim 10, wherein the surface structure is arranged at least at a first surface of the thermal line in that the thermal line and the cold accumulator are adjoining each other.

12. The device according to claim 11, wherein the heat dissipator includes a thereto-electric module.

13. The device according to claim 1, wherein the heat dissipator borders the thermal line.

14. The device according to claim 1, wherein the active heat dissipator includes a ventilator.

15. The device according to claim 1, wherein the device includes an insulation which borders the cold accumulator.

16. The device according claim 15, wherein the insulation includes foamed material.

17. The device according to claim 1, further comprising a storage tank for taking up the liquid and the thermal line borders the storage tank.

18. The device according to claim 1, wherein the thermal line is essentially shaped as a hollow cylinder.

19. The device according to claim 18, wherein the cold accumulator is arranged at an outer shell surface of the hollow cylinder.

20. The device according to claim 19, wherein the storage tank is arranged within the hollow cylinder, wherein the hollow cylinder surrounds the storage tank.

21. The device according to claim 1, wherein the device is a carbonating device with a carbonator for carbonating the liquid.

22. A method of using the device according to claim 21, incorporating the device as a component for a storage arrangement to store liquid.

23. The method according to claim 22, wherein the thermal line is configured as walls for the storage arrangement.

24. The device according to claim 3, wherein the polymer is a polymer blend and/or a block polymer.

* * * * *